United States Patent [19]

Stamper et al.

[11] Patent Number: 5,267,734
[45] Date of Patent: Dec. 7, 1993

[54] VIDEO GAME HAVING CALENDAR DEPENDENT FUNCTIONALITY

[75] Inventors: Timothy D. J. Stamper, Ravenstone; Christopher T. J. Stamper, Twychoss Warks, both of England

[73] Assignee: Rare Coin It, Inc., Miami, Fla.

[21] Appl. No.: 875,362

[22] Filed: Apr. 29, 1992

Related U.S. Application Data

[62] Division of Ser. No. 531,217, May 31, 1990, abandoned.

[51] Int. Cl.⁵ .............................................. A63F 9/22
[52] U.S. Cl. ................................. 273/434; 273/435; 273/85 G; 273/148 B
[58] Field of Search ............... 273/434, 435, 436, 437, 273/438, 439, 433, 460, DIG. 28, 148 B, 85 G; 364/410

[56] References Cited

U.S. PATENT DOCUMENTS

| | | | |
|---|---|---|---|
| 4,352,492 | 10/1982 | Smith | 273/434 |
| 4,752,068 | 6/1988 | Endo | 273/434 |
| 4,858,930 | 8/1989 | Sato | 273/434 |
| 5,014,982 | 5/1991 | Okada et al. | 273/435 |

FOREIGN PATENT DOCUMENTS 2211975 7/1989 United Kingdom .......... 273/138 A

*Primary Examiner*—Jessica J. Harrison
*Attorney, Agent, or Firm*—Welsh & Katz, Ltd.

[57] ABSTRACT

A video game method and apparatus of the type which includes a calendar function which in part controls the play of the game. The apparatus includes game cartridges which have a power source, memory means, clock/calendar circuitry which interacts with the play of the game, so that game sequences are scheduled for active phases of game play at one or more predetermined time periods, during which time the player must play the game successfully. The player may be permitted to practice play of the game during steady state phases of game play prior to the active phases of game play.

12 Claims, 3 Drawing Sheets

VIDEO GAME HAVING CALENDAR DEPENDENT FUNCTIONALITY

This is a division, of application Ser. No. 07/531,217, filed May 31, 1990, now abandoned.

FIELD OF THE INVENTION

The present invention generally relates to video games, and more particularly, to video games whereby the play of the game is at least partially controlled as a function of time in a broad sense.

BACKGROUND OF THE INVENTION

Video games have experienced varying degrees of popularity since they have been introduced to the mass market in the 1970's, and such games have been improved from a technological perspective with the advancement in electronic minituation and microprocessors. As a result of such advancements, there are home entertainment video game systems presently available of the type that can be connected to television receivers, that can be used to play games which exhibit superior capabilities, including detailed color graphics, enhanced speed and game complexity. These capabilities are believed to be a major factor in the current popularity of such systems, including the NES video game system marketed by Nintendo. Because there are scores of different games that are available for such home entertainment game systems in the form of plug-in cartridges, and because game designers are continuing to use their considerable talents in developing new games, it is generally believed that the popularity of such video games will continue.

The continuing advancement in the development of microprocessors enables more complex and more realistic game strategies to be developed, with the more powerful processors being capable of handling enormous amounts of data at sufficient speeds so that detailed graphic displays can be generated and changed at speeds that are commensurate with game requirements.

While there have been many different types of games developed for both commercial coin operated game systems, as well as for home entertainment video game systems, the game architecture for all known prior art games has involved playing the game when the player desires to play it and concluding play when the game is completed or when the player tires of playing the game or is required to terminate play for various reasons. The success of the play of the game is determined at the time of play, by virtue of a total score, by reaching a particular level of play in a multi-level game architecture, or the like.

There are some games that have storage means, such as a memory means, whereby the score achieved, the level achieved or the like, by a player can be stored, so that a player can resume play of the game at a later time without penalty. This capability permits a proficient player to resume play at a level of play that is more difficult than that which a beginning player may be capable of for certain types of games. Such storage capability also permits players of sports and other games to resume play at a later time if a prior game session had to be interrupted for some reason. Some games employ a password command that enables a player to resume play at a later time.

While many of the existing games provide considerable enjoyment for the player or players, and require much skill to become proficient, virtually all known games are of the type which can be played without constraint or conditions, and can be reset or replayed whenever the player chooses to do so. Many can be interrupted at any time and the play can then be resumed when it is convenient for the player.

It is a primary object of the present invention to provide an improved method and apparatus for a video game that derives from a new game concept of interacting the element of time in a broad sense with the play of the game.

It is an object of the present invention to provide an improved video game, in terms of apparatus and method, wherein the game is played in stages or sequences and in real time, and thereby introduces an element of realism that has heretofore been absent in video games.

It is an object of the present invention to provide an improved video game wherein the play of the game occurs over an extended period of time, i.e., a period of days, weeks or even months, during which period game sequences are attempted at predetermined play intervals which are important and others of which are not.

A related object of the present invention lies in the provision of providing such an improved game whereby the playing of a particular game sequence must be done at a certain predetermined time interval and success achieved or the player must repeat some or all of prior sequences before reattempting the sequence that was unsuccessfully attempted or missed. A corollary is that playing of a sequence before the certain predetermined time interval may be done to prepare for the playing of the sequence at the predetermined time interval, i.e., the player can practice for the upcoming event, with the aim to successfully accomplish the requirements of the game sequence when it counts.

It is yet another object of the present invention to provide such an improved video game which has a clock/calendar function that determines, in combination with the design of the game, when certain game sequences of a multi-sequence game can be played for the purpose of practicing and for the purpose of playing the game sequence for determining the success or failure of the player in the particular game sequence.

Still another object of the present invention is to provide a game cartridge for insertion in a home entertainment video game system wherein the game cartridge includes storage means for storing software instructions and other data relating to the play of a game, a self contained power source for maintaining data in a portion of the storage means, and a means for providing a calendar function.

These and other objects will become apparent upon reading the following detailed description of the present invention, while referring to the attached drawings, in which:

DETAILED DESCRIPTION

Figure 1:
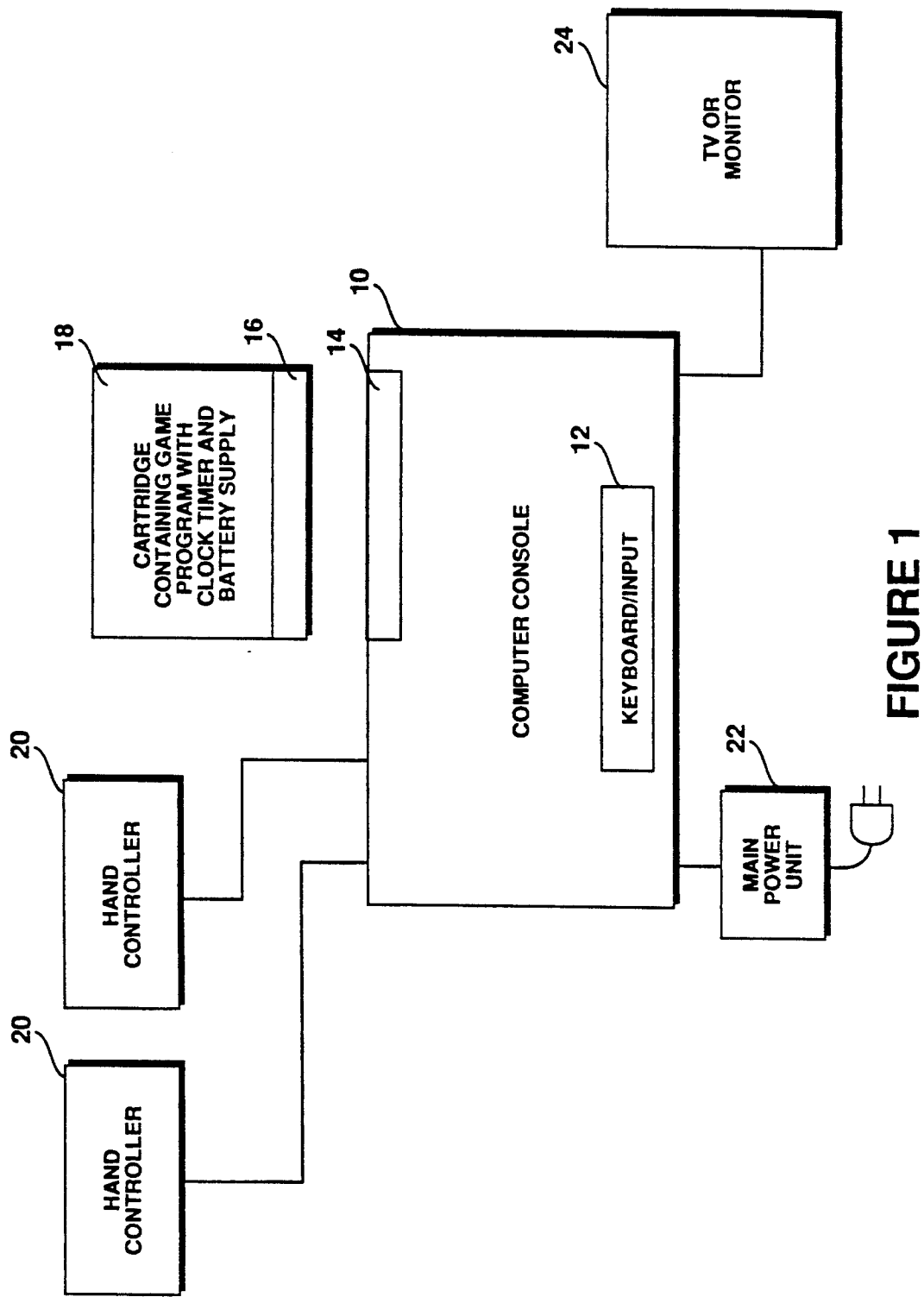
FIG. 1 is a block diagram of a video game system of the type in which game cartridges can be inserted for playing video games, and is shown together with a television receiver or monitor.
Figure 2:
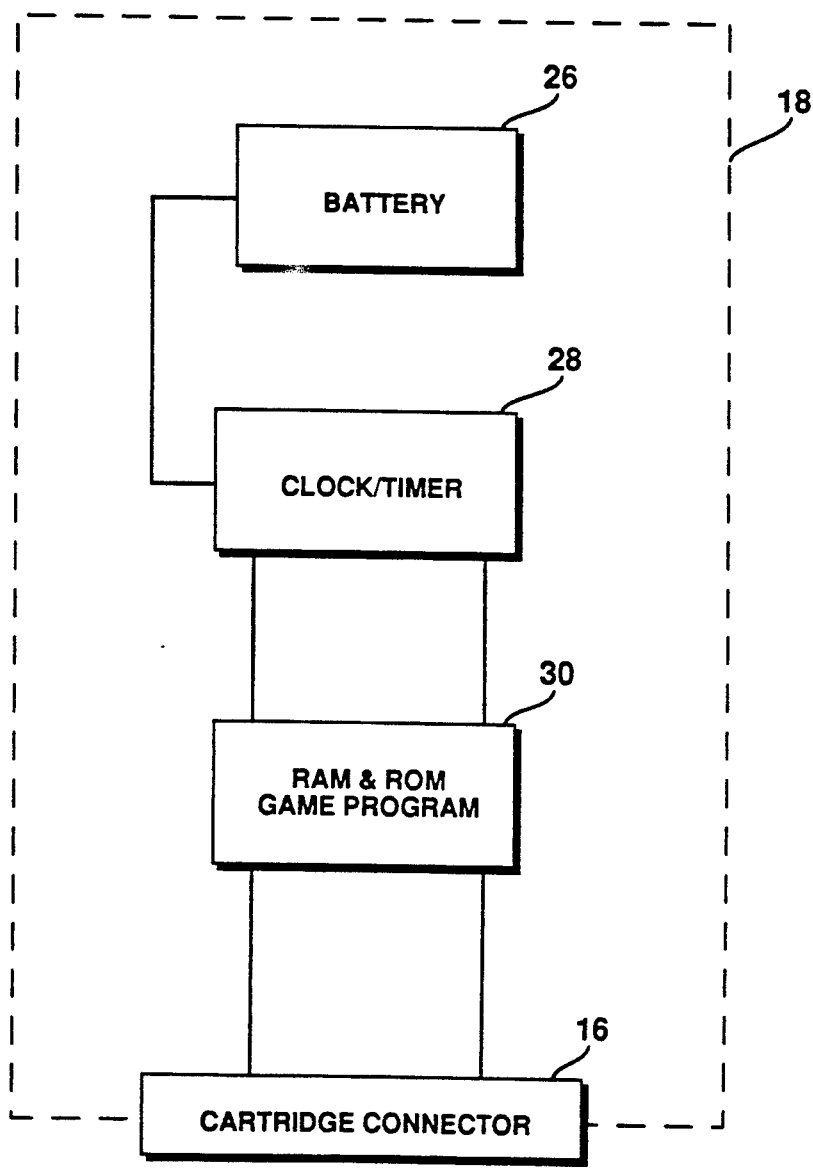
FIG. 2 is a block diagram of a video game cartridge embodying the present invention; and, FIG. 3 is a flow chart of the software instructions which are incorporated in the software of a video game that embodies the present invention.

Broadly stated, the present invention is directed to a method and apparatus for a video game which until a time/calendar function in combination with the play of a game which results in games having play characteristics that are believed novel. However, the present invention is not limited to home entertainment video game systems having plug-in cartridges, but is particularly adapted for systems of such type. The video game apparatus of the present invention may have one or more games which may be resident in the apparatus. Also, the present invention is not limited to any particular game, but may be made a part of many existing types of games. However, the attributes of the present invention literally opens the door to many new games which have heretofore not been realistically explored.

As will be more fully appreciated from the ensuing description, the present invention involves as aspect of real time that is intertwined with the play of the game, regardless of the type of game that is being played. This can be readily appreciated and understood from the following discussion of exemplary games that may be written if the precepts of the present invention were incorporated in the games.

For example, a game of "Around the World in 80 days" require 80 days to complete, where the game requires the player during the play of the game to maintain a schedule on a day by day basis, i.e., the player is required to travel a certain distance each day, with the distance traveled being a function of the skill of the player in manipulating a balloon, to navigate around storms, to achieve the proper course to reach interim destinations, to avoid tall buildings, to repair control lines and the like, to land the balloon for refueling, among other tasks. The game may require the player to drive a car during the trip, and it may be necessary for the player to be at specified locations at predetermined times to catch a scheduled departing train or boat. If the player fails to meet the schedule by traveling the required distances or in reaching a necessary interim destination during a game sequence, or misses play for a day, the player may be required to take a more lengthy alternate route or experience some appropriate penalty, or make up for the lack of requisite progress during succeeding days.

The above described game, as well as other games may be comprised of a plurality of game sequences, i.e., the sequences comprising a multiple sequence game design, with each sequence being completed in the order of the game as the game designers have determined.

In accordance with an important aspect of the present invention, a time/calendar function is provided and controls when the game can be played in either an active phase or a steady state or practice phase. This results in the active play phase sequences being required to be played at predetermined times and dates. This is accomplished in a preferred embodiment by a player entering the time and date when he initially sets up the game if the game is resident in a game apparatus, or when a cartridge containing a new game is initially inserted into a home entertainment video game system after a player has acquired the game cartridge. Alternatively, the programmed instructions in the cartridge may result in the game being automatically initialized when the cartridge is initially inserted into a game console. Still another embodiment would result in initializing a game within a game cartridge when power is applied to the cartridge for the first time, i.e., when a battery is inserted in the cartridge or a battery circuit is closed by removing a tab or the like. In the above described preferred embodiment, when the game has been initialized by keying in the time and date, the game then has predetermined time periods when the game can be played "for real" (the active phase) or for practice (the steady state phase). For example, the "Around the world in 80 days" game may be designed so that a player must attempt to travel the required distance for each day during the time period from 4:00 p.m. to 7:00 p.m for an active phase play period of ½ hour. If the task is accomplished, then the player may be "on schedule" and is ready to carry out the next successive sequence on the following day. If the player does not complete the task, there will preferably be an appropriate penalty, such as repeating one or more game sequences, or even starting over, or the player must attempt to complete the task from the preceding sequence and in addition, carry out all of the required tasks of the next game sequence during the next succeeding scheduled active phase play. It should also be appreciated that the game designers can determine the days and time periods of various lengths during which active phase play must be carried out to successfully play the game, and the game designers can also specify days and time periods during the steady state phase of play when practice sessions may be attempted. In other words, merely because the game is in steady state phase does not automatically means that the player can practice, and such capability is a function of the program instructions that are determined by the game designers. In fact, it is contemplated that no practice sessions may be possible between active phase play sessions for certain game applications.

However, for many games, such time scheduling enables the player to practice the upcoming game sequence during the steady state phase before the time period where the player is required to attempt the tasks during the active phase. Thus, if the player practices, the player will most probably experience an increase in proficiency in accomplishing the necessary tasks, and will therefore have a better chance to successfully carry out the necessary tasks, or to make up for prior substandard performance.

It should be understood and appreciated that the present invention is adapted for many types of games in addition to the above described "Around the world in 80 days". Other types of games may include war games generally, battleship games, pirate games, space games, adventure games, sports games, educational games, self-improvement and health related games, among others. As will be appreciated, virtually any type of game wherein a time/calendar function can be incorporated can be made the subject of the present invention.

More particularly, another adventure game may be a werewolf game, which could encompass the player changing into a werewolf every full moon when the werewolf destroys things or otherwise causes havoc, or is chased by people. The full moons are scheduled on a periodic basis, A Dr. Jekyll and Mr. Hyde game may have the player changing into Mr. Hyde who cannot control himself and causes trouble, and as Dr. Jekyll, the player must find a cure for himself. A detective game may require the player to be at certain places at certain times to meet people to obtain clues to solve a mystery case.

In the sports arena, football, basketball, baseball, tennis, hockey and other games may be made in accordance with the present invention. A whole season of a particular sport such as football may be the scheduled, with the player selecting a team at the beginning of the season, the player thereafter training the game players daily, for the purpose of preparing for matches every weekend. If successful during the "regular" season, the player's team may progress to the playoffs.

With regard to space games, a spacecraft game is particularly adapted to the present invention. In this game, a spacecraft may have the same appearance as the NASA space shuttle and the player may have to carry out a plurality of missions, including launching from the earth, changing from earth orbit to go to the moon, landing on the moon, operating a lunar buggy, launching from the moon, docking with a space station, among other game sequences. Each of the sequences requires different techniques and tasks which are scheduled to occur in real time, in the sense that landing on the moon is scheduled to occur after the actual time it takes for the spacecraft to travel to the moon. Prior to performing the lunar landing, for example, the player can practice simulation landings in anticipation of the "actual" landing so that the player has a better chance of carrying out the landing without crashing. Once the predetermined time for the "actual" landing arrives, i.e., the active phase, the player must then successfully land the spacecraft on the moon to advance to the next mission or game sequence. If the player fails, he may then be required to commence play at another predetermined point of play, determined by program instructions, which may be one or more previous missions or even at the beginning of the game.

In accordance with another aspect of the present invention, the screen is preferably provided with a message or other indicia which indicates whether that mission or game sequence has been successfully completed. If it has, the game supplier may provide certificates of accomplishment or attractive game "patches" to those players who take a picture of the screen with the indicia present. In the Real Frontier game, up to 9 separate mission patches may be obtained in this manner.

Turning now to the drawings, and particularly FIG. 1, a block diagram of a home entertainment video game system which embodies the present invention is illustrated, and in its preferred embodiment, includes a console 10 which has a computing means, such as a microprocessor, a keyboard or input portion 12 comprising a plurality of keys or switches which are capable of inputting the current time and date. The console 10 has a multi-pin connector 14 adapted to receive the corresponding pins of a complementary multi-pin connector 16 of an exemplary game cartridge 18 which may have one or more games resident in the cartridge 18. The system preferably includes one or more player game controllers 20 which may be of varying styles depending upon the particular game that is being played, e.g., a joystick type of controller. The system is also shown to have a separate power supply 22 which may be plugged into a standard electrical outlet. The system is connected to a standard television receiver 24 or to a video monitor so that the play of the game can be viewed by the player.

In accordance with another important aspect of the preferred embodiment of the present invention, the game cartridge 18 has a source of power, preferably a battery 26 which powers a date/calendar timer circuit 28, as well as memory circuitry 30, including random access memory circuitry (RAM) and read only memory circuitry (ROM). As is typical, the program instructions for the game itself and for interacting the time and calendar functions with the play of the game is resident in the ROM circuitry, and the RAM circuitry retains the necessary data that is generated during the play of the game by the player. Because of the presence of the battery 26, the data in RAM can be maintained even when the game cartridge 18 is removed from the console 10, which facilitates, among other things, other games to be played before or after a "necessary" or scheduled playing of one or more games embodying the present invention.

While the preferred embodiment has been described, an alternative embodiment can utilize a memory storage device other than the cartridge, and can include a floppy disc storage device, or other device that is capable of storing data and program instructions. If a game is played on a console or personal computer which has an internal clock, a floppy disc can store the time and date at the conclusion of a playing session, whether it be during the active phase play or steady state phase. When the floppy disc is reinserted, the program instructions can poll the appropriate location of the stored time and date information, compare it with the time and date information from the internal clock, update the status of the game, and the game can then be continued.

Figure 3:
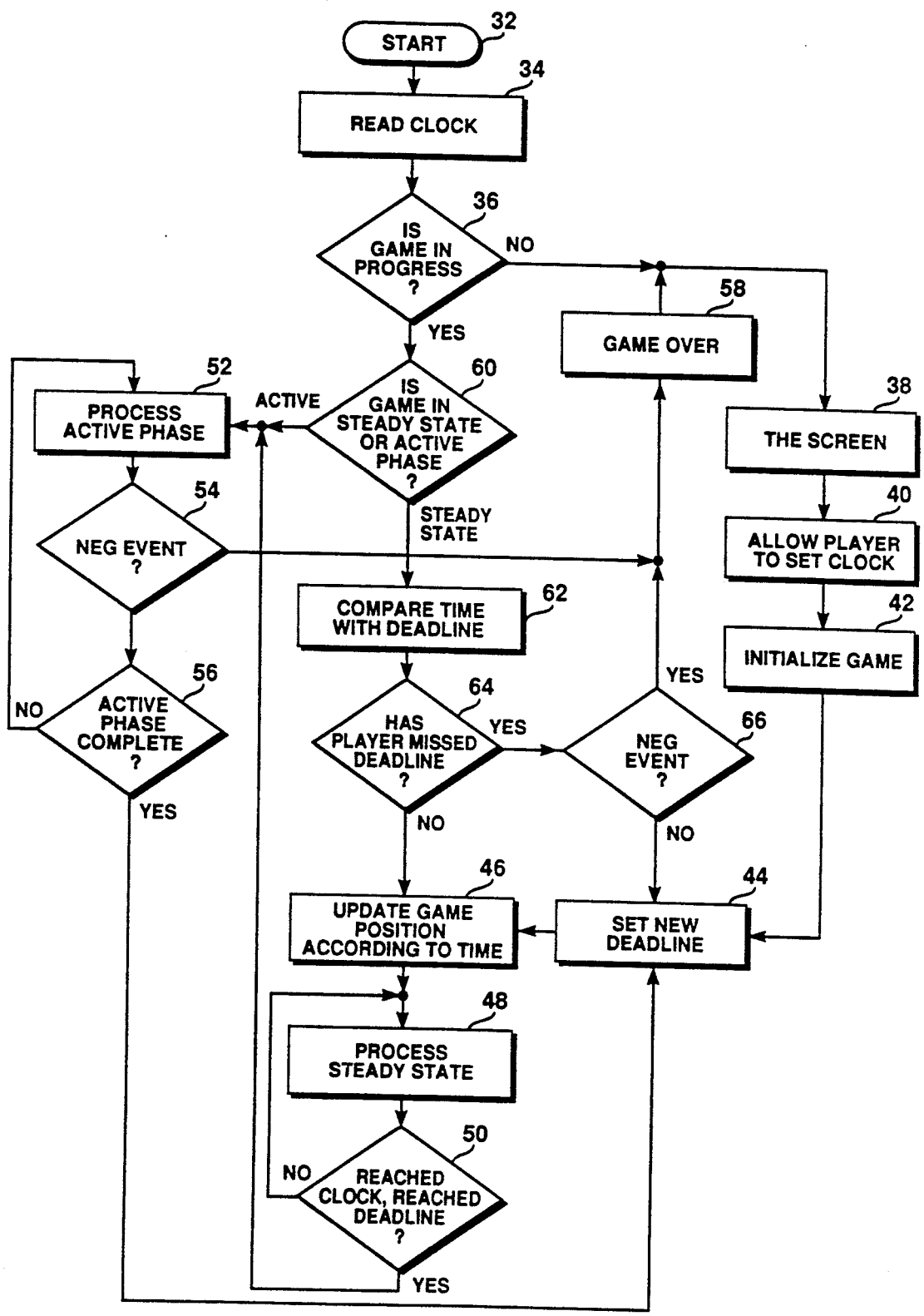

The program instructions that are used in the operation of games made in accordance with the present invention are set forth in the flow chart shown in FIG. 3. As illustrated by the flow chart, when one of the game cartridges 18 is inserted into the console 10 and the console energized, the program starts (block 32) and the clock is read (block 34). After this has been done, the program determines whether the game is in progress (block 36). If the game is not in progress, the title screen of the game is called up (block 38), the player is permitted to set the clock (block 40) and the game is initialized (block 42). Once initialized, the game determines or sets the new deadline for the game (block 44). This results in the program updating the game position according to the current time (block 46).

The program then maintains the game in steady state (block 48) during which time the player can play the game in a practice mode so that the player can improve his proficiency or even learn the game sequence that will be coming up next. This status continues until the clock has reached a deadline (block 50), whereupon the game is placed in an active mode (block 52). During the active mode, the play of the game counts, and play continues during the active mode until a negative event occurs, such as the player being killed as in a crash or the like (block 54) or the game sequence is completed (block 56). If a negative event occurs, the game is over (block 58), which in the flow chart illustrated, results in the game being started over (block 38). If the negative event never occurs (block 54) and the game sequence is completed (block 56), a new deadline is set (block 44) for the next game sequence that is to be played and that is initially in a steady state phase which enables the player to practice until the active phase is scheduled.

If after the cartridge 18 has been inserted and the console 10 turned on, it is determined that the game is in progress (block 36), the program determines if it is in the steady state as opposed to the active phase (block 60). If it is in the active phase, play of the game can continue (block 52); if the game is in the steady state phase, the program compares the time with the deadline (block 62) and determines if the deadline has been missed (block 64). If the deadline has been missed, then the program determines that a negative event has occurred (block 66), and in the illustrated flow chart, the game is over (block 58). If the player has not missed the deadline (block 64), the game position is updated according to the current time (block 46).

As should be understood, the program instructions for each of the games will be called up during the play of the game, whether it is in the active or steady state phase of operation, and the flow chart of instructions shown in FIG. 3 will be contained in ROM as a part of the program in the game cartridges. It should also be understood that while the flow chart of FIG. 3 shows the game being over when a negative event occurs, the program may for certain games, merely cause the game program to be repositioned to one or more sequences that had previously occurred, thus not penalizing the player completely, in the sense that the player would be required to completely start over. It should also be understood that a video game contains program instructions relating to the play of a game, and these instructions are written into read only memory by the manufacturer or game supplier. Playing the game results in choosing alternative program instructions by signals applied by manipulation of the game controller by the player. It should also be understood that the present invention is adapted for implementation in games having more than one player.

From the foregoing detailed description, it should be understood that an improved video game apparatus and method has been described which has superior attributes and advantages that will offer much pleasure and excitement for those game players who enjoy video games. The present invention introduces a new concept in game design relative to the known prior art.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. Apparatus for playing video games having multiple sequences of game play, wherein a game player must successfully accomplish predetermined game tasks in each sequence in order to advance to succeeding game sequences, said apparatus having computing means for processing program instructions for carrying out the play of a game, said apparatus being adapted to be connected to a display means, which displays a series of graphic images during the play of a game, said apparatus comprising:

memory means for storing data relating to the play of a game and to the status of the game being played, including program instructions which define the multiple sequence video game, circuit means for providing a time function, said program instructions defining time periods dedicated to active play phases and time periods dedicated to steady state play phases, the active state play phases determining times during which a player must attempt and successfully carry out game sequences to succeed in playing the game.

2. Apparatus as defined in claim 1 wherein said circuit means for providing a time function is further characterized to provide a clock and calendar function, so that said steady state play phases and said active play phases can be specified in terms of the time of day and of the date.

3. Apparatus as defined in claim 2 wherein said memory means includes a magnetically readable and writable floppy disc.

4. Apparatus as defined in claim 2 wherein said memory means includes random access memory means and read only memory means.

5. Apparatus as defined in claim 4 wherein said apparatus has a console, said console containing said computing means and a data inputting means for entering the time and date, said apparatus including game player controlling means for use in playing the game, said memory means being contained in a removable cartridge, said cartridge including means for energizing said random access memory means to maintain data stored therein when said cartridge is separated from said console.

6. Apparatus as defined in claim 5 wherein said means for energizing said random access memory means comprising a battery means.

7. Apparatus for playing game which has a visual display which a player observes during the play of the game, said apparatus including a console containing computing means for processing program instructions relating to the play of a game, data input means for providing input data relating to the play of a game, memory means for containing data and program instructions defining the play of a game controller means operable by a player for varying the play of the game as a function of the alternative program instructions that are present and which are a function of the design of the game, the game having game phases of play that are date and time dependent, said game apparatus having means for providing a data and time function for the game.

8. A video game apparatus comprising: a computing means for executing program instructions relating to the play of a video game; a display means illustrating graphic images relating to the play of said game during the play of said game; player input control means; said game having a plurality of play sequences that are determined by said computing means executing program instructions provided by said game, the player altering the order of the program instructions during the play of said game, said game having a calendar function that at least partially controls the order of instructions during the play.

9. A video game apparatus of the type wherein the play of a multiple ordered play sequence type of game is viewable on a display means, said apparatus comprising:

computing means for executing program instructions relating to the play of the game;
memory means containing program instructions which control the play of the game;
controller means adapted for manipulation by a player during the play of the game for the purpose of carrying out the play of the game;
clock means for providing the time and date;
means for powering said clock means;
said program instructions providing interaction of the time and date with the play of the game wherein the game is selectively placed in one of two phases of game play, one of said phases being an active game phase play, the other phase being a steady state phase of play, the player being capable of practicing the game during steady state phases, the player being required to accomplish predetermined tasks during active phases to advance to a successive sequence of game play.

10. Apparatus as defined in claim 9 wherein said memory means includes random access memory means and read only memory means.

11. Apparatus as defined in claim 10 wherein said apparatus includes a console, said console containing said computing means and a data inputting means for entering the time and date, said controller means being connected to said console, said apparatus including removable cartridges containing said memory means, said clock means and said means for powering said clock means, access memory means to maintain data stored therein when said cartridge is separated from said console.

12. Apparatus as defined in claim 11 wherein said means for energizing said random access memory means comprising a battery means.

* * * * *

REEXAMINATION CERTIFICATE (4398th)

United States Patent
Stamper et al.

(10) Number: US 5,267,734 C1
(45) Certificate Issued: Jul. 17, 2001

(54) VIDEO GAME HAVING CALENDAR DEPENDENT FUNCTIONALITY

(75) Inventors: Timothy D. J. Stamper, Ravenstone; Christopher T. J. Stamper, Twychoss Warks, both of (GB)

(73) Assignee: Rare Coin It, Inc., Miami, FL (US)

Reexamination Request:
No. 90/004,843, Nov. 21, 1997

Reexamination Certificate for:
Patent No.: 5,267,734
Issued: Dec. 7, 1993
Appl. No.: 07/875,362
Filed: Apr. 29, 1992

Related U.S. Application Data

(62) Division of application No. 07/531,217, filed on May 31, 1990, now abandoned.

(51) Int. Cl.$^7$ .................................................. A63F 9/22
(52) U.S. Cl. ......................... 463/23; 273/148 B; 463/44
(58) Field of Search .................... 463/23, 44; 273/148 B

(56) References Cited

U.S. PATENT DOCUMENTS

| | | |
|---|---|---|
| 4,072,930 | 2/1978 | Lucero et al. . |
| 4,216,461 | 8/1980 | Werth et al. . |

(List continued on next page.)

FOREIGN PATENT DOCUMENTS

| | | |
|---|---|---|
| 0 431 723 A2/A3 | 6/1991 | (EP) . |
| 2 211 975 A | 7/1989 | (GB) . |
| 63-318979 | 12/1988 | (JP) . |
| 63-318980 | 12/1988 | (JP) . |
| 63-318981 | 12/1988 | (JP) . |
| 63-318982 | 12/1988 | (JP) . |

OTHER PUBLICATIONS

A Computer Owner's Guide to Care of and Communication With LITTLE COMPUTER PEOPLE, *Instructions for Commodore 64™/128™* (1985).

Activision Home Computer Software Catalog (G–940–05), (1985).

"Border Zone," game instructions, 3 pages.

McComb, Gordon, *POPULAR SCIENCE*, "Playing the new adult–rated computer games," pp. 92–97, Jul. 1984.

Shapiro, Neil, *POPULAR MECHANICS*, "The World's Longest Game," pp. 54–55, Jul. 1982.

(List continued on next page.)

*Primary Examiner*—Jessica J. Harrison

(57) ABSTRACT

A video game method and apparatus of the type which includes a calendar function which in part controls the play of the game. The apparatus includes game cartridges which have a power source, memory means, clock/calendar circuitry which interacts with the play of the game, so that game sequences are scheduled for active phases of game play at one or more predetermined time periods, during which time the player must play the game successfully. The player may be permitted to practice play of the game during steady state phases of game play prior to the active phases of game play.

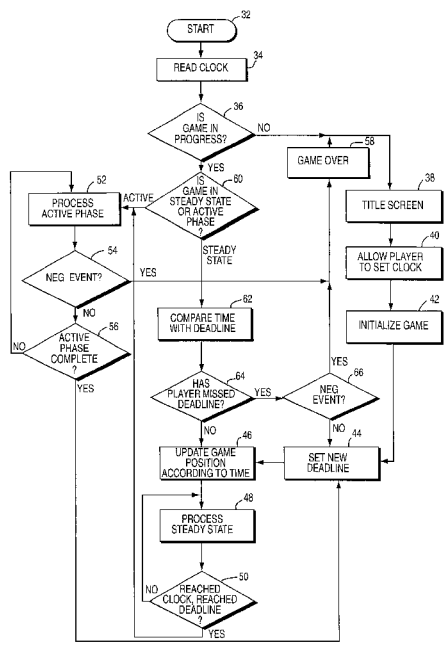

(Amended)

U.S. PATENT DOCUMENTS

| | | |
|---|---|---|
| 4,247,925 | 1/1981 | Meshi et al. . |
| 4,285,517 | 8/1981 | Morrison . |
| 4,335,809 | 6/1982 | Wain . |
| 4,352,492 | 10/1982 | Smith . |
| 4,366,960 | 1/1983 | Bromley et al. . |
| 4,382,280 | 5/1983 | Mandel et al. . |
| 4,525,800 | 7/1985 | Hamerla . |
| 4,575,622 | 3/1986 | Pellegrini . |
| 4,607,351 | 8/1986 | Gerber et al. . |
| 4,607,844 | 8/1986 | Fullerton . |
| 4,652,998 | 3/1987 | Koza et al. . |
| 4,657,247 | 4/1987 | Okada . |
| 4,698,783 | 10/1987 | Nishimuro et al. . |
| 4,729,563 | 3/1988 | Yokoi . |
| 4,752,068 | 6/1988 | Endo . |
| 4,763,300 | 8/1988 | Yukawa . |
| 4,791,608 | 12/1988 | Fushimoto . |
| 4,799,635 | 1/1989 | Nakagawa . |
| 4,811,288 | 3/1989 | Kleijne et al. . |
| 4,815,733 | 3/1989 | Yokoi . |
| 4,858,930 | 8/1989 | Sato . |
| 4,865,321 | 9/1989 | Nakagawa et al. . |
| 4,912,346 | 3/1990 | Mizuta . |
| 4,948,138 | 8/1990 | Pease et al. . |
| 4,962,934 | 10/1990 | Taylor . |
| 4,975,842 | 12/1990 | Darrow et al. . |
| 5,014,982 | 5/1991 | Okada et al. . |
| 5,018,736 | 5/1991 | Pearson et al. . |
| 5,073,931 | 12/1991 | Audebert et al. . |
| 5,095,430 | 3/1992 | Bonito et al. . |
| 5,162,989 | 11/1992 | Matsuda . |
| 5,179,517 | 1/1993 | Sarbin et al. . |
| 5,214,622 | 5/1993 | Nemoto et al. . |
| 5,257,179 | 10/1993 | DeMar . |
| 5,307,263 | 4/1994 | Brown . |
| 5,313,211 | 5/1994 | Tokuda et al. . |
| 5,370,399 | 12/1994 | Liverance . |
| 5,387,164 | 2/1995 | Brown, Jr. . |

OTHER PUBLICATIONS

Internet Documents, "The Roguelike Games Home Page," last revised May 13, 1996; "List of major roguelike games," 2 pages; "List of older roguelike games," 2 pages; "List of minor roguelike games," 3 pages; "The Rogue Home Page," 1 page, last changed Feb. 28, 1996.

Internet Document, "Rocky's Boots," May 30, 1997.

Internet Document, "Border Zone," Feb. 6, 1996.

Press Release, "Activision 'Little Computer People' Project: Research Update" (Activision, Mountain View, California, Jul. 12, 1985).

Emery, Jr., C. Eugene, "Who's the little guy in there?" *Knickerbocker News*, p. 22 (Albany, New York, Dec. 16, 1985).

Advertisement, "We're learning to love the Little People who live inside computers." (USA TODAY, Nov. 11, 1985).

Mulloy, Mike, "David, dog, others live inside computers" (Maywood Herald, Oak Park, Illinois, Jan. 29, 1986).

Katz, Arnie, "The Little Computer People Project," pp. 47–49 (*AHOY!*, Mar. 1986).

Research Update: Activision, "Little Computer People" Project, p. 9 (*Computer Entertainer*, Aug. 1985).

Bishop, David, "Little Computer People" (*Computer and Video Games* 1985).

Bartimo, Jin, "Q&A: David Crane," p 84 (*InfoWorld*, Mar. 12, 1984).

Advertisement, "Who's living in your computer? 'It's Me!'" p. 62, (*Commodore Computing*, Dec. 1985).

Kristiansen, Rasmus Kirkegård, "The Little Computer People—Hvor Kommer De Fra?" pp 4–7(*SOFT*, Jan./Feb. 1986) (with translation).

Gavin, Maurice, "The Halley Orrery, A program to show the comet's orbit," pp 64–66 (*NewScientist*, SPOTTERS–GUIDE, HALLEY'S COMET) (London England, 1985).

Advertisement, "Unitsoft Distribution" (*Computer and Video Games*, May 1986).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

THE DRAWING FIGURES HAVE BEEN CHANGED AS FOLLOWS:

FIG. 3, in box 38, "THE SCREEN" has been changed to "TITLE SCREEN".

AS A RESULT OF REEXAMINATION, IT HAS BEEN DETERMINED THAT:

The patentability of claims 9–12 is confirmed.

Claims 1, 7 and 8 are determined to be patentable as amended.

Claims 2–6, dependent on an amended claim, are determined to be patentable.

New claims 13–33 are added and determined to be patentable.

1. Apparatus for playing video games having multiple sequences of game play, wherein a game player must successfully accomplish predetermined game tasks in each sequence in order to advance to succeeding game sequences, said apparatus having computing means for processing program instructions for carrying out the play of a game, said apparatus being adapted to be connected to a display means, which displays a series of graphic images during the play of a game, said apparatus comprising:

memory means for storing data relating to the play of a game and to the status of the game being played, including program instructions which define [the] a multiple sequence video game, circuit means for providing a time function, said program instructions defining time periods dedicated to active play phases and time periods dedicated to steady state play phases, the active state play phases determining times during which a player must attempt and successfully carry out game sequences to succeed in playing the game.

7. Apparatus for playing *a* game which has a visual display which a player observes during the play of the game, said apparatus including:

a console containing computing means for processing program instructions relating to the play of a game, data input means for providing input data relating to the play of a game, memory means for containing data and program instructions defining the play of a game, controller means operable by a player for varying the play of the game as a function of [the] *alternative* program instructions that are present and which are a function of the design of the game, the game having game phases of play that are date and time dependent, said game apparatus having means for providing a [data] *date* and time function for the game, said program instructions requiring, in response to said date and time function, the player during the play of the game to maintain a schedule on a day by day basis.

8. A video game apparatus comprising:

a computing means for executing program instructions relating to the play of a video game;

a display means illustrating graphic images relating to the play of said game during the play of said game;

player input control means;

said game having a plurality of play sequences that are determined by said computing means executing program instructions provided by said game, the player altering the order of the program instructions during the play of said game, said game having a calendar function that at least partially controls the order of instructions during the play,

*said video game program instructions requiring the player during the play of the game to maintain a schedule on a day by day basis.*

*13. Apparatus for playing a game which has a visual display which a player observes during the play of the game, said apparatus including:*

*a console containing computing means for processing program instructions relating to the play of a game,*

*data input means for providing input data relating to the play of a game,*

*memory means for containing data and program instructions defining the play of a game,*

*controller means operable by a player for varying the play of the game as a function of alternative program instructions that are present and which are a function of the design of the game, the game having game phases of play that are date and time dependent,*

*said game apparatus having means for providing a date and time function for the game,*

*said program instructions providing, in response to said date and time function, at least one required game play event on successive days.*

*14. A video game apparatus comprising:*

*a computing means for executing program instructions relating to the play of a video game;*

*a display means illustrating graphic images relating to the play of said game during the play of said game;*

*player input control means;*

*said game having a plurality of play sequences that are determined by said computing means executing program instructions provided by said game, the player altering the order of the program instructions during the play of said game,*

*said game having a calendar function that at least partially controls the order of instructions during the play,*

*said program instructions providing, in response to calendar function, at least one required game play event on successive days.*

*15. Apparatus for playing a game which has a visual display which a player observes during the play of the game, said apparatus including:*

*a console containing computing means for processing program instructions relating to the play of a game,*

*data input means for providing input data relating to the play of a game,*

*memory means for containing data and program instructions defining the play of a game,* controller means operable by a player for varying the play of the game as a function of alternative program instructions that are present and which are a function of the design of the game, the game having game phases of play that are date and time dependent, said game apparatus having means for providing a date and time function for the game, said program instructions providing, in response to said date and time function, at least one required game play event at approximately the same time on successive days.

16. A video game apparatus comprising:

a computing means for executing program instructions relating to the play of a video game;

a display means illustrating graphic images relating to the play of said game during the play of said game;

player input control means;

said game having a plurality of play sequences that are determined by said computing means executing program instructions provided by said game, the player altering the order of the program instructions during the play of said game, said game having a calendar function that at least partially controls the order of instructions during the play, said program instructions providing, in response to said calendar function, at least one required game play event at approximately the same time on successive days.

17. Apparatus for playing a game which has a visual display which a player observes during the play of the game, said apparatus including:

a console containing computing means for processing program instructions relating to the play of a game, data input means for providing input data relating to the play of a game, memory means for containing data and program instructions defining the play of a game, controller means operable by a player for varying the play of the game as a function of alternative program instructions that are present and which are a function of the design of the game, the game having game phases of play that are date and time dependent, said game apparatus having means for providing a date and time function for the game, said program instructions providing, in response to said date and time function, at least one required game play event approximately during the same time interval on successive days.

18. A video game apparatus comprising:

a computing means for executing program instructions relating to the play of a video game;

a display means illustrating graphic images relating to the play of said game during the play of said game;

player input control means;

said game having a plurality of play sequences that are determined by said computing means executing program instructions provided by said game, the player altering the order of the program instructions during the play of said game, said game having a calendar function that at least partially controls the order of instructions during the play, said program instructions providing, in response to said calendar function, at least one required game play event approximately during the same time interval on successive days.

19. Apparatus for playing a game which has a visual display which a player observes during the play of the game, said apparatus including:

a console containing computing means for processing program instructions relating to the play of a game, data input means for providing input data relating to the play of a game, memory means for containing data and program instructions defining the play of a game, controller means operable by a player for varying the play of the game as a function of alternative program instructions that are present and which are a function of the design of the game, the game having game phases of play that are date and time dependent, said game apparatus having means for providing a date and time function for the game, said program instructions repeating, in response to said date and time function, at least one required game play event on successive days.

20. A video game apparatus comprising:

a computing means for executing program instructions relating to the play of a video game;

a display means illustrating graphic images relating to the play of said game during the play of said game;

player input control means;

said game having a plurality of play sequences that are determined by said computing means executing program instructions provided by said game, the player altering the order of the program instructions during the play of said game, said game having a calendar function that at least partially controls the order of instructions during the play, said program instructions repeating, in response to said calendar function, at least one required game play event on successive days.

21. Apparatus for playing a game which has a visual display which a player observes during the play of the game, said apparatus including:

a console containing computing means for processing program instructions relating to the play of a game, data input means for providing input data relating to the play of a game, memory means for containing data and program instructions defining the play of a game, controller means operable by a player for varying the play of the game as a function of alternative program instructions that are present and which are a function of the design of the game, the game having game phases of play that are date and time dependent, said game apparatus having means for providing a date and time function for the game, said program instructions scheduling, in response to said date and time function, at least one required game play event to occur sometime during a predetermined time period on successive days.

22. A video game apparatus comprising:

a computing means for executing program instructions relating to the play of a video game;

a display means illustrating graphic images relating to the play of said game during the play of said game;

player input control means;

said game having a plurality of play sequences that are determined by said computing means executing program instructions provided by said game, the player altering the order of the program instructions during the play of said game, said game having a calendar function that at least partially controls the order of instructions during the play, said program instructions scheduling, in response to said calendar function, at least one required game play event to occur sometime during a predetermined time period on successive days.

23. Apparatus for playing a game which has a visual display which a player observes during the play of the game, said apparatus including:

a console containing computing means for processing program instructions relating to the play of a game, data input means for providing input data relating to the play of a game, memory means for containing data and program instructions defining the play of a game, controller means operable by a player for varying the play of the game as a function of alternative program instructions that are present and which are a function of the design of the game, the game having game phases of play that are date and time dependent, said game apparatus having means for providing a date and time function for the game, said program instructions requiring, in response to said date and time function, the player during the play of the game to perform interactions with the game on an ongoing day by day basis.

24. A video game apparatus comprising:

a computing means for executing program instructions relating to the play of a video game;

a display means illustrating graphic images relating to the play of said game during the play of said game;

player input control means;

said game having a plurality of play sequences that are determined by said computing means executing program instructions provided by said game, the player altering the order of the program instructions during the play of said game, said game having a calendar function that at least partially controls the order of instructions during the play, the program instructions requiring, in response to said calendar function, the player during the play of the game to perform interactions with the game on an ongoing day by day basis.

25. Apparatus for playing a game which has a visual display which a player observes during the play of the game, said apparatus including:

a console containing computing means for processing program instructions relating to the play of a game, data input means for providing input data relating to the play of a game, memory means for containing data and program instructions defining the play of a game, controller means operable by a player for varying the play of the game as a function of alternative program instructions that are present and which are a function of the design of the game, the game having game phases of play that are date and time dependent, said game apparatus having means for providing a date and time function for the game, the program instructions requiring, in response to said date and time function, the player during the play of the game to perform interactions with the game on an ongoing basis extending over a time period exceeding twenty-four hours.

26. A video game apparatus comprising:

a computing means for executing program instructions relating to the play of a video game;

a display means illustrating graphic images relating to the play of said game during the play of said game;

player input control means;

said game having a plurality of play sequences that are determined by said computing means executing program instructions provided by said game, the player altering the order of the program instructions during the play of said game, said game having a calendar function that at least partially controls the order of instructions during the play, the program instructions requiring, in response to said calendar function, the player during the play of the game to perform interactions with the game on an ongoing basis extending over a time period exceeding twenty-four hours.

27. Apparatus for playing a game which has a visual display which a player observes during the play of the game, said apparatus including:

a console containing computing means for processing program instructions relating to the play of a game, data input means for providing input data relating to the play of a game, memory means for containing data and program instructions defining the play of a game, controller means operable by a player for varying the play of the game as a function of alternative program instructions that are present and which are a function of the design of the game, the game having game phases of play that are date and time dependent, said game apparatus having means for providing a date and time function for the game, the program instructions scheduling, in response to said date and time function, at least one game play sequence over a period of at least a week.

28. A video game apparatus comprising:

a computing means for executing program instructions relating to the play of a video game;

a display means illustrating graphic images relating to the play of said game during the play of said game;

player input control means;

said game having a plurality of play sequences that are determined by said computing means executing program instructions provided by said game, the player altering the order of the program instructions during the play of said game, said game having a calendar function that at least partially controls the order of instructions during the play, the program instructions scheduling, in response to said calendar function, at least one game play sequence over a period of at least a week.

29. Apparatus for playing a game which has a visual display which a player observes during the play of the game, said apparatus including:

a console containing computing means for processing program instructions relating to the play of a game, data input means for providing input data relating to the play of a game, memory means for containing data and program instructions defining the play of a game, controller means operable by a player for varying the play of the game as a function of alternative program instructions that are present and which are a function of the design of the game, the game having game phases of play that are date and time dependent, said game apparatus having means for providing a date and time function for the game, the program instructions requiring, in response to said date and time function, the play of game play sequences at predetermined times.

30. A video game apparatus comprising:

a computing means for executing program instructions relating to the play of a video game;

a display means illustrating graphic images relating to the play of said game during the play of said game;

player input control means;

said game having a plurality of play sequences that are determined by said computing means executing program instructions provided by said game, the player altering the order of the program instructions during the play of said game, said game having a calendar function that at least partially controls the order of instructions during the play, the program instructions requiring, in response to said calendar function, the play of game play sequences at predetermined times.

31. A video game apparatus comprising:

a computing means for executing program instructions relating to the play of a video game;

a display means illustrating graphic images relating to the play of said game during the play of said game;

player input control means;

said game having a plurality of play sequences that are determined by said computing means executing program instructions provided by said game, the player altering the order of the program instructions during the play of said game, said game having a calendar function that at least partially controls the order of instructions during the play, said program instructions requiring, in response to said calendar function, the play of game play sequences on predetermined days.

32. Apparatus for playing a game which has a visual display which a player observes during the play of the game, said apparatus including:

a console containing computing means for processing program instructions relating to the play of a game, data input means for providing input data relating to the play of a game, memory means for containing data and program instructions defining the play of a game, controller means operable by a player for varying the play of the game as a function of alternative program instructions that are present and which are a function of the design of the game, the game having game phases of play that are date and time dependent, said game apparatus having means for providing a date and time function for the game, the means for providing a date and time function for the game including a hardware-based timer circuit providing a time output, said program instructions scheduling the play of a game play event based on the timer circuit's output.

33. A video game apparatus comprising:

a computing means for executing program instructions relating to the play of a video game;

a display means illustrating graphic images relating to the play of said game during the play of said game;

player input control means;

said game having a plurality of play sequences that are determined by said computing means executing program instructions provided by said game, the player altering the order of the program instructions during the play of said game, said game having a calendar function that at least partially controls the order of instructions during the play, said video game apparatus including a hardware-based timer circuit providing a time output, said program instructions scheduling the play of a game play event based on the timer circuit's output.

* * * * *